Feb. 18, 1964

J. S. ARNOLD ETAL 3,121,327

VIBRATION MEASURING APPARATUS

Filed June 17, 1958

INVENTORS
JAMES S. ARNOLD
AND JOHN G. MARTNER
BY
ATTORNEYS

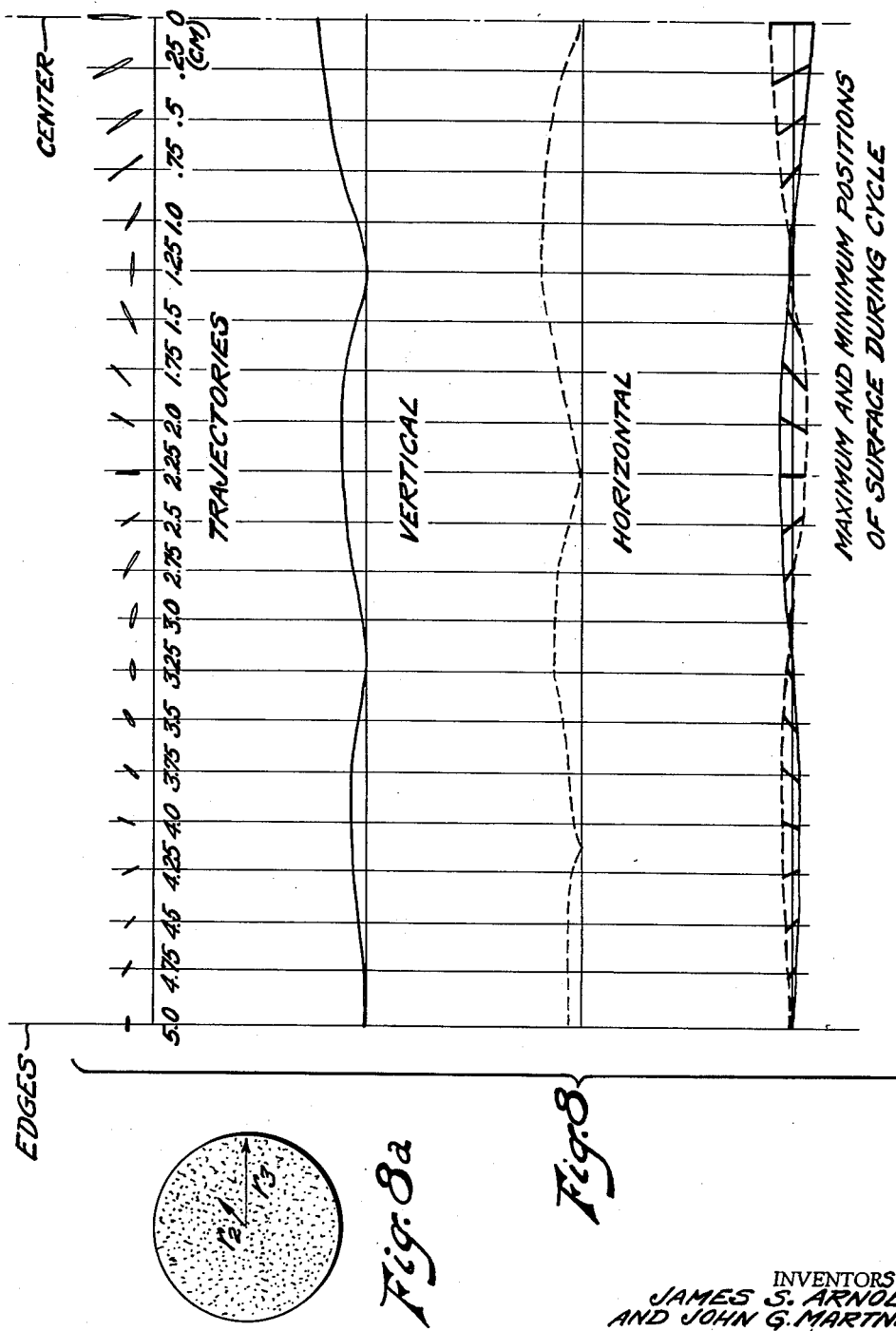

Feb. 18, 1964 J. S. ARNOLD ETAL 3,121,327
VIBRATION MEASURING APPARATUS
Filed June 17, 1958 5 Sheets—Sheet 5

INVENTORS
JAMES S. ARNOLD
AND JOHN G. MARTNER
BY
ATTORNEYS

United States Patent Office 3,121,327
Patented Feb. 18, 1964

3,121,327
VIBRATION MEASURING APPARATUS
James S. Arnold, Palo Alto, and John G. Martner, Daly City, Calif., assignors to the United States of America as represented by the Secretary of the Air Force
Filed June 17, 1958, Ser. No. 742,697
2 Claims. (Cl. 73—71.4)

This invention relates to apparatus for nondestructively testing structural bonds, particularly structural adhesive bonds in multi-part structures used in airplane manufacture.

The use of adhesive in the fabrication of metal and metal-plastic composite structures involves techniques that have become very efficacious in many fields of design and manufacturing, particularly those related to aircraft. Also adhesives have become important in the fabrication of some nonmetal structures, e.g., joining glass cloth skins to glass mat waffle cores. The adhesive bond has unique characteristics that can be important to aircraft designers. Many factors affect the quality of adhesive bonds and a variety of destructive and nondestructive tests have been proposed and used in efforts to measure both qualities. Destructive tests on adhesive bonded samples are widely used. They determine bond quality by destroying the bonds thus making the part unusable. As a result the evaluation of usable bonds is based on statistical and process control variables—a procedure which is quite satisfactory in many applications. There exists, however, applications in which a direct indication of bond strength in usable assemblies is desired, particularly where such bonds are involved in the structural integrity of aircraft, e.g., honeycomb sandwich structure. In these instances the need for a nondestructive method of bond evaluation is obvious.

In U.S. patent application Ser. No. 493,843, filed by James S. Arnold, now Patent No. 2,851,876 one of the co-applicants herein, on March 11, 1955, there are disclosed methods and apparatus for the evaluation of the strength of bonds between structural surfaces of a specimen under test, which methods involve the conversion of ultrasonic vibrations into electrical voltage values, through the instrumentality of a transducer that receives the vibratory impulses along a simple axis normal to the plane of the bond being tested. The present invention adds to the method the concept of causing the impulses to be transmitted, biaxially, in contrast to the uniaxial transmission of the earlier invention. Specifically, the impulses are transmitted along two orthogonally related axes, each inclined at an angle of 45 degrees in relation to the plane of the bond being tested. In this manner there are obtained two measuring components in the form of electrical signals whose respective amplitudes and phase relationships can be utilized to reconstruct the relative motion of a point on a vibratory surface, by separately amplifying the two signal outputs derived from the respective diverging impulse conductors, and then utilizing the amplitude and phase characteristics of said amplified signals to reconstruct the vibrational pattern of the forces acting upon the specimen under test.

Other characteristics and objects of the invention will be apparent upon examination of the following description of one method of practicing said invention, together with a description of means appropriate for execution of the described method, which means are illustrated in the accompanying drawings. In said drawings:

FIG. 8 is a collection of graphs showing trajectories and surfaces deflections during the cyclic periods.

FIG. 8a is a large-scale illustration of a component particle, with a vector diagram superimposed thereon to illustrate the biaxial division of forces for analysis by the apparatus of the invention.

Figure 1:
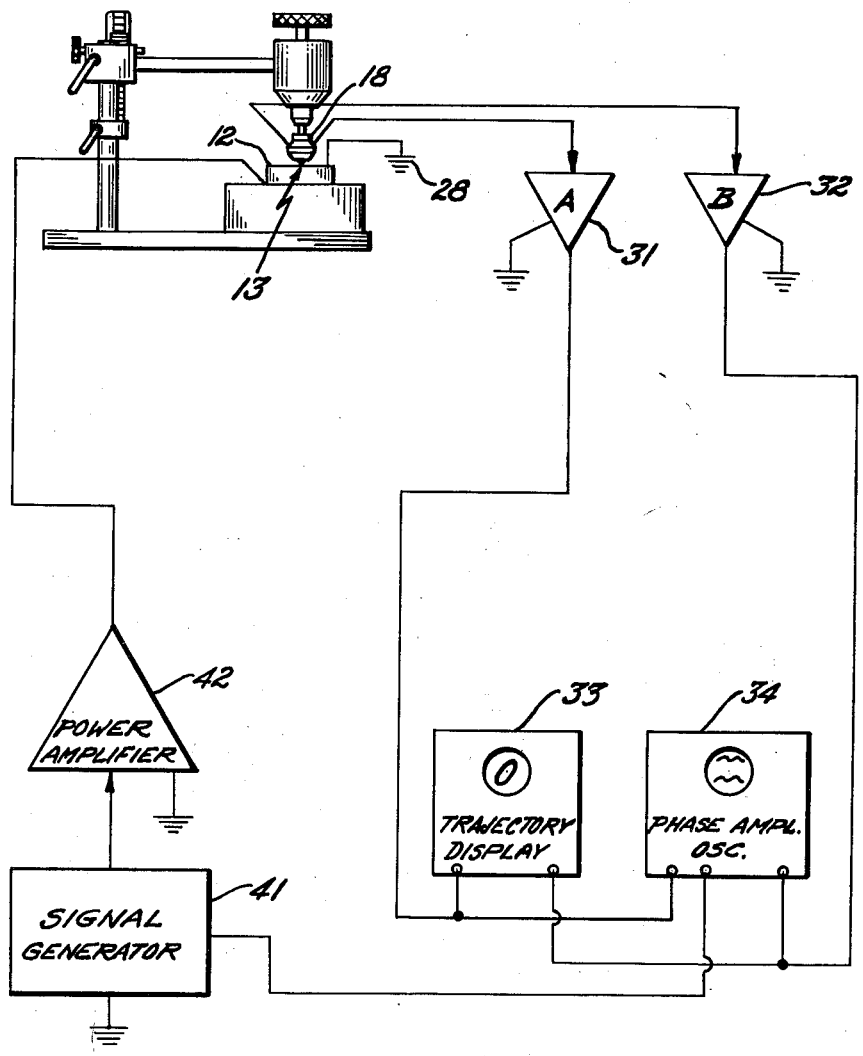
FIG. 1 is a block diagram including a schematic representation of apparatus appropriate for practice of the invention, which apparatus also embodies the invention.
Figure 2:
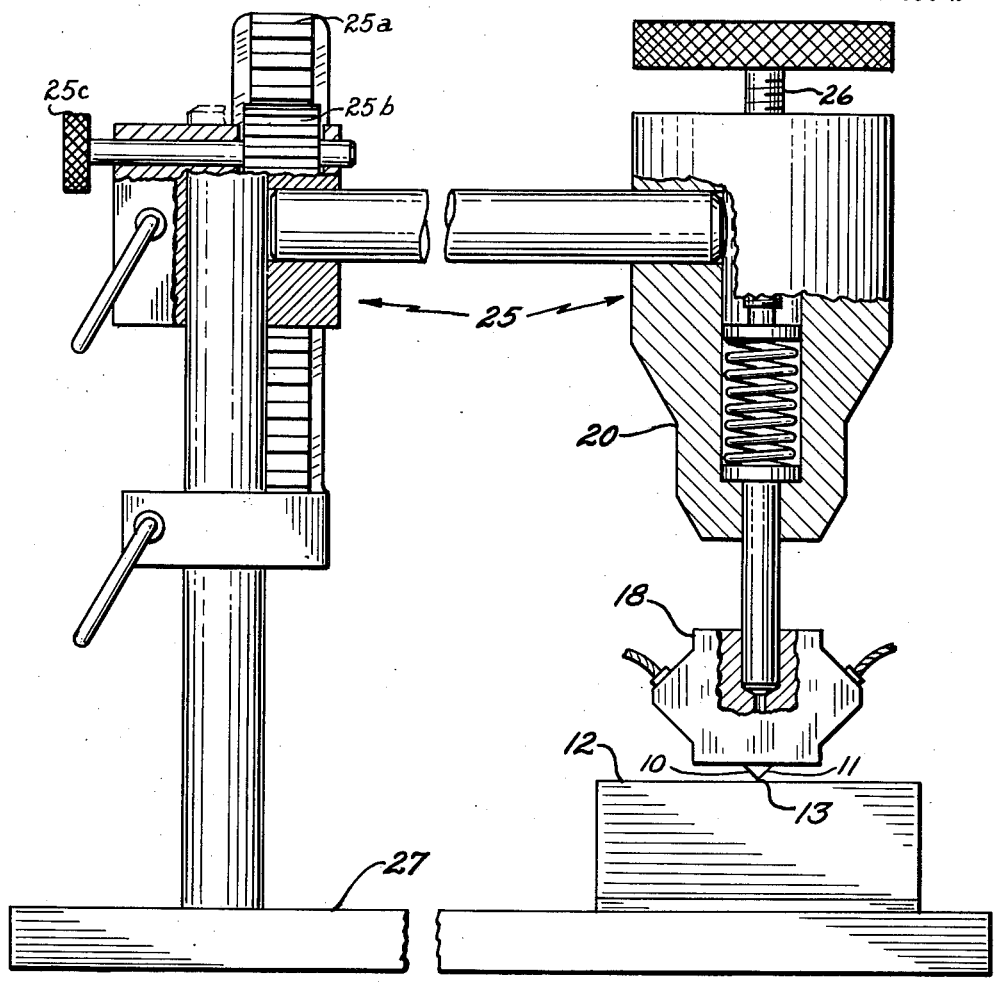
FIG. 2 is a view, partly in elevation and partly in vertical section, of certain components of the apparatus illustrated in FIG. 1.
Figure 3:
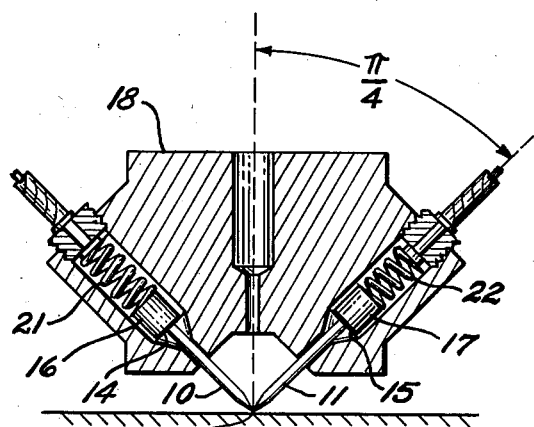
FIG. 3 is a sectional view, on a larger scale, of a portion of the apparatus illustrated in FIG. 2.
Figure 4:
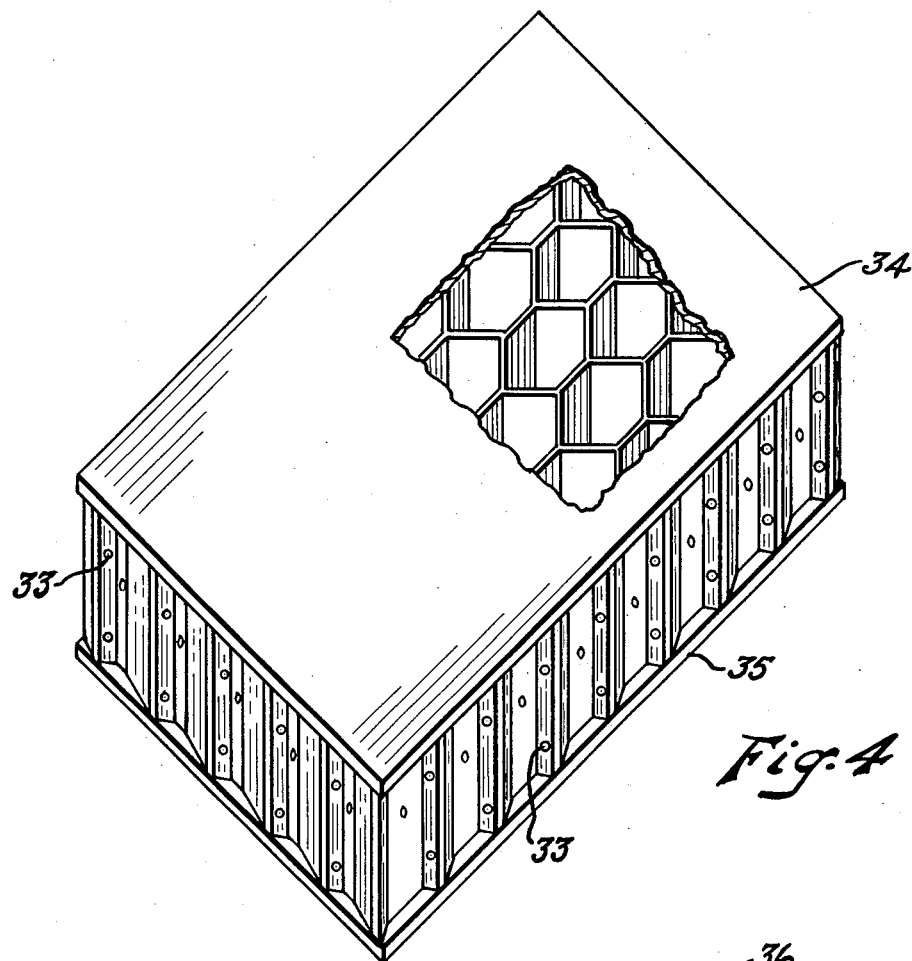
FIGS. 4 and 5 are perspective views of test specimens examinable by the method and apparatus; illustrated in FIGS. 1 to 3.
Figure 5:
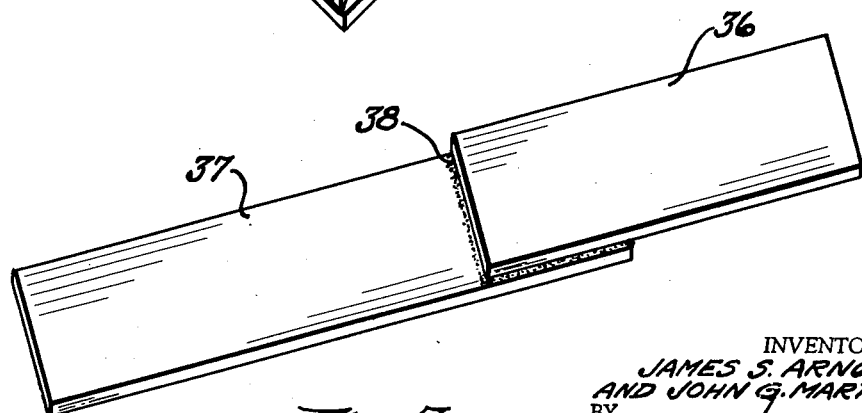

Referring first to FIGS. 1, 2, and 3, these figures illustrate what may be designated as a biaxial vibration analyzer, functioning to generate electrical signals and convert such signals into a pictorial display in the form of an oscillographic trace of a trajectory pattern corresponding to the vibrational pattern characteristic of the forces imparted to the testing probe as it rides upon the surface of the test specimen.

*General*

As explained below, the motion of a vibrating surface point can be represented by three parameters that contain information about the trajectory. These parameters are the two component displacemets, and the phase angle between them. These components of motion can be determined from a biaxial vibration pickup (BVP).

The trajectory of a vibrating point particle, when the total displacements are small, can be made to drive a wire or quartz filament pressed against the point. The longitudinal component of the vibration is transmitted through this filament, the other end of which drives a suitable transducer to produce a voltage that is proportional to the displacement (or a time derivative) of the driving vibration. Components of vibration normal to the filament produce bending and the voltage generated by this motion is small compared to that from motion transmitted longitudinally. The filament thus makes it possible to isolate and measure the component of the motion along the filament axis. Two such filaments and transducers are needed to describe the motion of a point on a vibrating surface, and by measurement of amplitudes and phase angles the motion can be reconstructed and displayed.

A complete biaxial vibration analyzer was constructed using this basic idea. The apparatus for obtaining the signals, analyzing them, and synthesizing an oscilloscope trace to display the particle trajectory is described in the following paragraphs.

*Biaxial Vibration Pickup and Mounting*

Two steel wires 10, 11 are used as the probe filaments which decompose the motion of the vibrating surface 12 into its components. Each wire transmits only vibration components along its axis. The two wires are mounted in a vertical plane above the horizontal surface of the workpiece, each wire at an angle of 45° from the vertical, as in FIGURE 3. The lower ends of the wires are connected together at the point (13) of contact with the vibrating surface. The upper ends 14, 15 rest against two transducers 16, 17 which convert the motion components into electric signals which can be amplified and displayed. Barium titanate transducers are used, the dimensions being chosen to avoid internal resonances in the expected frequency range.

The transducers and wires are firmly held in a brass block 18 that provides enough mass to damp extraneous vibrations. Firm contact between wires, vibrating surface and transducers is attained by means of a pressure adjusting mechanism 20 at the probe head. The transducers are spring loaded against the wires, as indicated at 21 and 22, to provide uniform pressure as well as compensation for wires of different lengths.

The pickup mounting 25 (FIGURE 2) was designed to combine maximum versatility of movement along with rigidity, and is provided with a lead screw 26 to position the pickup in the vertical direction. The workpiece is mounted on a standard combination rotary and slide milling table 27, so that any point on the vibrating surface may be positioned reproducibly under the probe. The use of steel probe wires makes it necessary to have the vibrating surface grounded electrically, as indicated at 28, to avoid the pickup of undesired electric signals. FIGURE 1 shows the pickup as used in vibration measurements.

*Display Circuitry*

The electric signals provided by the probe transducers are small. To amplify them, the use of a pair of matched preamplifiers 31, 32 is necessary. Some of the design requirements for the matched preamplifiers are frequency response and sensitivity suitable for the intended measurements, in addition to a low noise level, phase shift compensation, and freedom from crosstalk. These preamplifiers deliver signals that are large enough to produce satisfactory deflection when applied to oscilloscope amplifier inputs.

Two oscilloscopes 33, 34 (FIGURE 1) function to make the desired measurements. One of these (trajectory display) may be a DuMont type 303A, which is desirable because of the similarity of the response frequency characteristics of its vertical and horizontal amplifiers. It may be adjusted so that there is no measurable phase difference in the responses when the same signal is connected to both the horizontal and vertical inputs. This condition is attained when the trace is a straight line. The normal position of the oscilloscope tube may be altered by rotating it 45°, the angle between the probe wire and the vibrating surface. When this is done and the gains of the two channels are made equal, the figure traced on the oscilloscope screen is an accurate representation of the motion. Correctness of the adjustment may be checked by noting that at low frequencies the center of a vibrating disc moves axially. Thus the proper orientation of the display is known, and can be compared with the observed trace.

It is desired, in the present usage, to measure the relative phase of the motion of many points on the vibrating surface in addition to describing the trajectory at a given point. To do this, a two-channel oscilloscope may be used with both channels swept in synchronism with the voltage that produced the vibration. A linear display of the two voltages may be provided, from which it is possible to measure their amplitudes (A and B), their relative phase angle ($\phi$), and their phase changes with respect to a fixed-phase reference. The acquisition of these data makes it possible to reconstruct the motions of all parts of the vibrating surface in their proper phase relationships.

*Example of Measurements*

The above described apparatus was used in a study of the vibration modes of a barium titanate ceramic disc. A disc of 4-inch diameter and ½-inch thickness was polarized with silver electrodes at both flat surfaces and allowed to rest on the platform of the holder. The upper electrode was grounded. The disc was excited by an oscillator and power amplifier connected to the two electrodes as in FIGURE 1. The BVP was pressed against the center of the disc, which was excited in one of its natural vibration modes. It was assumed that the geometrical center of the disc vibrated with an axial component only. This fact was used to adjust the equipment for proper amplitude, phase, and synchronism in the following way. Preamplifiers A and B were adjusted for equal gain and zero phase shift, and the trajectory display oscilloscope gain was adjusted for a linear vertical trace. The double beam oscilloscope was adjusted for synchronization with the signal generator and for equal amplitude in the two traces.

The BVP was moved along a disc radius, and the trajectory and phase information recorded at 2.5 mm. intervals. The recorded data were then used to synthesize the surface motion, resulting in the pattern illustrated in FIGURE 8. From this figure, it is obvious that all portions of the disc surface do not move in phase, and that they do not have equal motion amplitudes or identical directions. There are regions in which the motion is parallel to the surface, and others in which it is normal to the surface. The scale of the motion amplitudes is, of course, very small. A picture was made of the vibration configuration by the use of salt particles as described in WADC TR 54–231 Pt5. This picture indicates that the salt particles accumulated at the minima of the horizontal component, which do not represent true nodes, or complete absence of vibration, as indicated by the familiar Chladni figures of sand on vibrating membranes. Nodes of the Chladni type have also been observed and verified by means of the BVP technique.

The following assumptions may be made regarding the motion:

(1) Under steady-state conditions, the path traversed by the vibrating point (trajectory) is a closed curve that lies in a plane perpendicular to the surface.

(2) The components of the motion in the plane can be described in terms of their peak amplitudes and sinusoidal variation with time.

Figure 6:
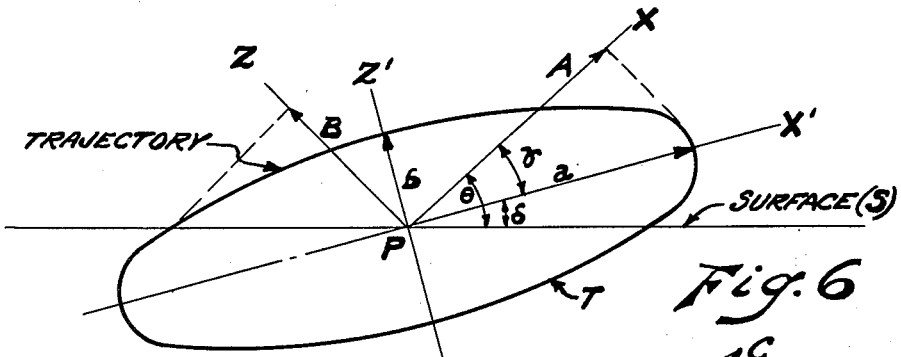
FIGS. 6 and 7 are diagrams of vibrational patterns produced when the test specimens are subjected to vibration-inducing forces.

The geometrical situation is shown in FIGURE 6, in which S is the vibrating surface and T the trajectory of the point that has the rest position P. The trajectory is confined to the plane normal to S, and is considered to have components of motion parallel and normal to the vibrating surface. For motion which is sinusoidal in the time variable, the shape of the trajectory is, in general, that of an ellipse with semi-axes $a$ and $b$, oriented at an angle $\delta$ to the vibrating surface. The parametric equations of the ellipse, referred to the primed axes are $$X' = a \cos wt_1 \qquad (1)$$
$$Z' = b \sin wt_1$$

This corresponds to counterclockwise motion of the point. Let the trajectory now be referred to a new set of orthogonal axes, XZ, oriented at an angle $\theta$ with the vibrating surface and making an angle gamma with an axis of the trajectory. The relation between the primed and unprimed coordinates (rotational transformation) are $$X = X' \cos \gamma + Z' \sin \gamma \qquad (2)$$
$$Z = -X' \sin \gamma + Z' \cos \gamma$$

Utilizing (1) in (2), it is seen that $$X = a \cos wt_1 \cos \gamma + b \sin wt_1 \sin \gamma \qquad (3)$$
$$Z = -a \cos wt_1 \sin \gamma + b \sin wt_1 \cos \gamma$$

Equation 3 describes the trajectory in the new (XZ) reference system. It is desired now to express this description in terms of new parameters such that $$X = A \cos (wt_1 + \phi_1) \qquad (4)$$
$$Z = B \sin (wt_1 + \phi_2)$$

in which A and B are as yet undetermined, and $\phi_1$ and $\phi_2$ are phase angles of the motions in the X and Z direction with respect to $wt_1$. Equation 4 can be rewritten, $$X = A \cos (wt_1 + \phi_1) \qquad (4')$$
$$Z = B \cos (wt_1 - \pi/2 + \phi_2)$$

Since the values of A, B, $\phi_1$, and $\phi_2$ are independent of time, set $t_1 = 0$ and $t_1 = \pi/2w$ in (4') and (3). Then $$A \cos \phi_1 = a \cos \gamma$$
$$B \cos (-\pi/2 + \phi_2) = B \sin \phi_2 = -a \sin \gamma$$
$$A \sin \phi_1 = -b \sin \gamma \qquad (5)$$
$$B \cos \phi_2 = b \cos \gamma$$

and $$\cos \phi_1 = \frac{a \cos \gamma}{A}, \cos \phi_2 = \frac{b \cos \gamma}{B}$$
$$\sin \phi_1 = \frac{-b \sin \gamma}{A}, \sin \phi_2 = \frac{-a \sin \gamma}{B} \qquad (6)$$

Functions of the phase difference, $\phi$, between the X and Y components can be found from $$\cos \phi = \cos (\phi_2 - \phi_1)$$
$$= \cos \phi_1 \cos \phi_2 + \sin \phi_1 \sin \phi_2$$
$$= \frac{1}{AB} [ab \cos^2 \lambda + ab \sin^2 \lambda]$$
$$= \frac{ab}{AB} \qquad (7)$$

$$\sin \phi = \sin (\phi_2 - \phi_1)$$
$$= \sin \phi_2 \cos \phi_1 - \cos \phi_2 \sin \phi_1$$
$$= \frac{1}{AB} [-a^2 \cos \gamma \sin \gamma + b^2 \cos \gamma \sin \gamma]$$
$$= \frac{(b^2 - a^2)}{2AB} \sin 2\gamma \qquad (8)$$

The magnitudes A and B can be found from (5), as $$A^2 (\sin^2 \phi_1 + \cos^2 \phi_1) = a^2 \cos^2 \gamma + b^2 \sin^2 \gamma$$
$$B^2 (\sin^2 \phi_2 + \cos^2 \phi_2) = a^2 \sin^2 \gamma + b^2 \cos^2 \gamma$$

and $$A = [a^2 \cos^2 \gamma + b^2 \sin^2 \gamma]^{\frac{1}{2}}$$
$$B = [a^2 \sin^2 \gamma + b^2 \cos^2 \gamma]^{\frac{1}{2}}$$

Equations 9 and 7 or 8 specify the ellipse in the XZ reference system in terms of the components of motion in that system and the phase angle, $\phi$, between them. The observations (from (9)) that $$A^2 + B^2 = a^2 + b^2$$
$$A = a|_{\gamma=0} \text{ and } B = b|_{\gamma=0}$$
$$= b|_{\gamma=\pi/2} \qquad = a|_{\gamma=\pi/2} \qquad (10)$$

indicate the ellipse to be properly represented in the new (XZ) coordinate system. By changing to a new reference time such that $wt = wt_1 - \phi_1$ $$X = A \cos wt \qquad (11)$$
$$Z = B \cos (wt + \phi)$$

in which $\phi = (\phi_2 - \phi_1 - \pi/2)$.

A motion measuring system is now introduced with the property that it produces a signal in each of two electrical channels ($E_1$ and $E_2$) such that $$E_1 = kX \qquad (12)$$
$$E_2 = kZ$$

and components of motion in directions other than X and Z do not affect the signals. A measurement plane ($P_m$) is thus defined, normal to the vibrating surface, that is chosen at present to be coincident with the XZ plane. The factor $k$ is a proportionality constant that includes the system amplification, and implies that any phase delay in the system is the same in the two channels. The peak values of $E_1$ and $E_2$, with the phase angle $\phi$ measured between $E_1$ and $E_2$ can, in principle, be used to determine the trajectory of P. Equations 5 and 6 could be solved explicitly for $\gamma$, $a$, and $b$, in terms of A, B, and $\phi$, and the substitution of these quantities derived from $E_1$ and $E_2$ by means of (11) and (12) would produce the values of $\gamma$, $a$, and $b$. The orientation of the measuring system with respect to the vibrating surface ($\theta$) is known, hence the orientation of the trajectory is established.

The synthesis of the trajectory can be done much more conveniently by the application of $E_1$ and $E_2$ to the deflection plates of an oscilloscope than by calculation. The oscilloscope, by virtue of its two sets of orthogonal deflection plates combines the effects of $E_1$ and $E_2$ on its electron beam in just the same manner that P moving in its trajectory produces $E_1$ and $E_2$ in the measurement system. Components of motion of P in the X direction deflect the beam proportionally on one oscilloscope axis, while motion of P in the Z direction deflects the beam on the other axis. As X and Z are orthogonal, as are the oscilloscope axes, the beam traces a path on the oscilloscope face that is similar in form to the motion of P, but enlarged according to the system gain, $k$. If the oscilloscope tube is rotated by an angle $\theta$ so that its deflection directions correspond to the X and Z directions along which these components of the motion of the surface are converted to the electrical form, the directional sense is preserved, and the vertical and horizontal movements of P produce corresponding vertical and horizontal movements of the trace. The system is thus an electromechanical mapping device for enlarging and displaying the trajectory of the vibrating surface point.

Figure 7:
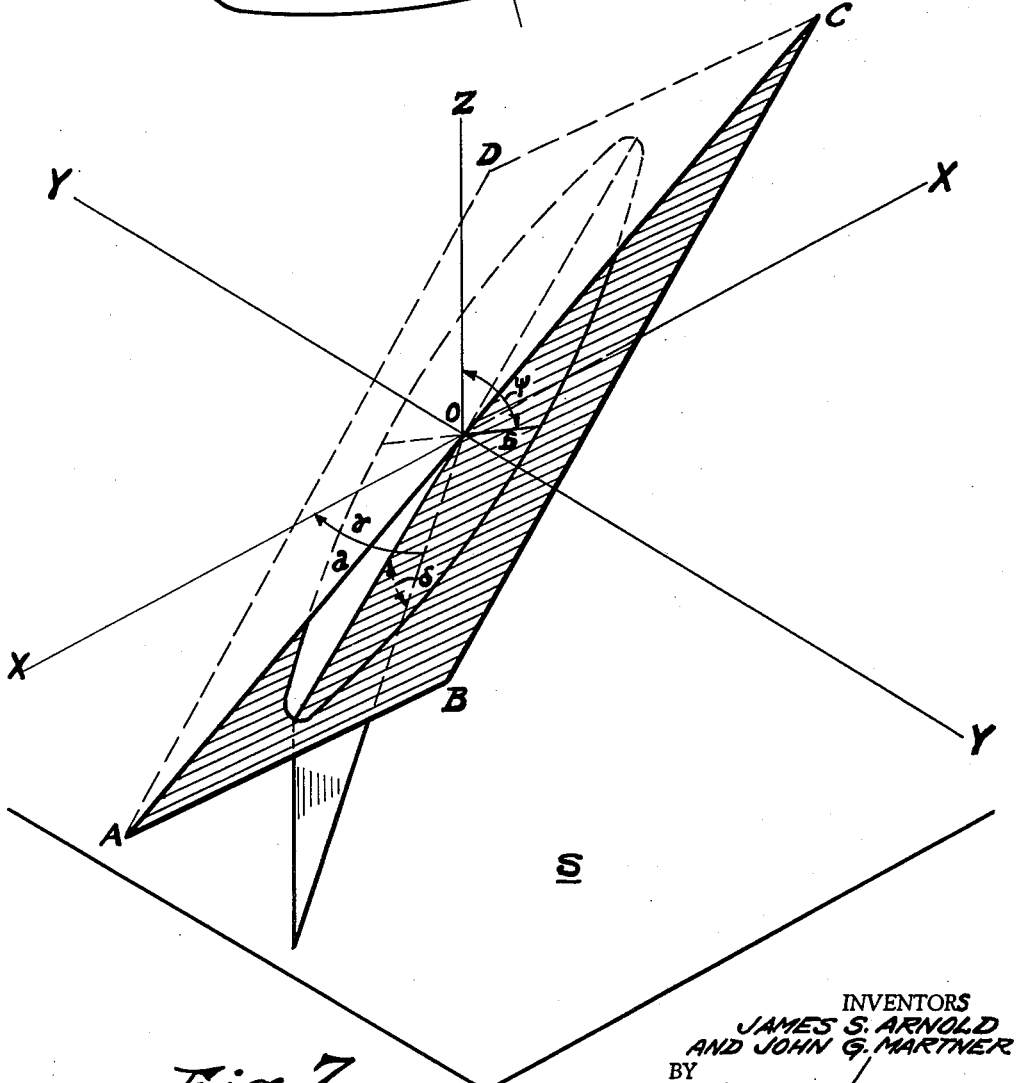

The previous restriction that the trajectory plane be normal to the vibrating surface can now be removed, although the measurement plane is still normal to the surface and contains the Z-axis. The geometrical situation is illustrated in FIGURE 7, where the XY coordinates have a different significance from FIGURE 6. The ellipse was major and minor semi-axes $a$ and $b$ in the plane ABCD is the trajectory of the point that is at 0 when undisturbed. The line AC is the intersection of the trajectory plane with the body surface. The lengths $a$ and $b$, and the angles $\alpha$, $\beta$, and $\psi$ describe the ellipse and its orientation with respect to the fixed axes X, Y, and Z.

The measurement plane ($P_m$) is first rotated around the Z axis by an angle $\alpha$ to maximize the linear extension of the projected trajectory. When this condition exists, $P_m$ will contain the Z-axis, $a$. The values of $a$ and $\beta$ can then be measured in $P_m$, and $\beta$ is determined by the rotation of $P_m$ that was necessary to maximize the linear extension of the projected trajectory. $\alpha$, $\beta$, and $a$ are thus determined.

$P_m$ is then rotated $\pi/2$ radians from the position of maximum linear extension. It then contains the Z-axis and $b$. Both $b$ and $\psi$ can now be determined by direct measurement, and the 5 parameters that describe the ellipse and its orientation are thus known.

In the case that a vibrating point moves in 3 dimensions in such a manner that $$X = X_1 \cos (wt + \phi_1)$$
$$Y = Y_1 \cos (wt + \phi_2) \qquad (13)$$
$$Z = Z_1 \cos (wt + \phi_3)$$

it can be proved that the motion is still confined to a plane, and is generally an ellipse. The measurements described above will thus apply to the general case of vibration in 3 dimensions, provided the motion can be described by a system of equations such as (13).

What we claim is:

1. Apparatus for evaluating physical characteristics of a test specimen, said apparatus comprising a pair of transducers, a pair of transducer-energizing stress conductors joined at a point on the surface of said specimen, means for disposing said conductors in orthogonal relationship, one to the other, with the axis of each conductor and its associated transducer forming an oblique angle with the plane of said surface, and means for displaying electrical signals corresponding in amplitude to the two complementary vibration-measuring electrical components, each of which components is transmitted separately from its source transducer, said disposing means including a pair of resilient pressure-applying means for said conductors, and means for adjusting said pressure-applying means.

2. Apparatus as defined in claim 1, wherein said adjusting means includes an element operating to apply the same physical forces, simultaneously, to both said pressure-applying means.

References Cited in the file of this patent

UNITED STATES PATENTS 2,892,152    Buisson _____ June 23, 1959

FOREIGN PATENTS 1,099,055    France _____ Mar. 15, 1955
933,064    Germany _____ Sept. 15, 1955